Patented Dec. 18, 1951

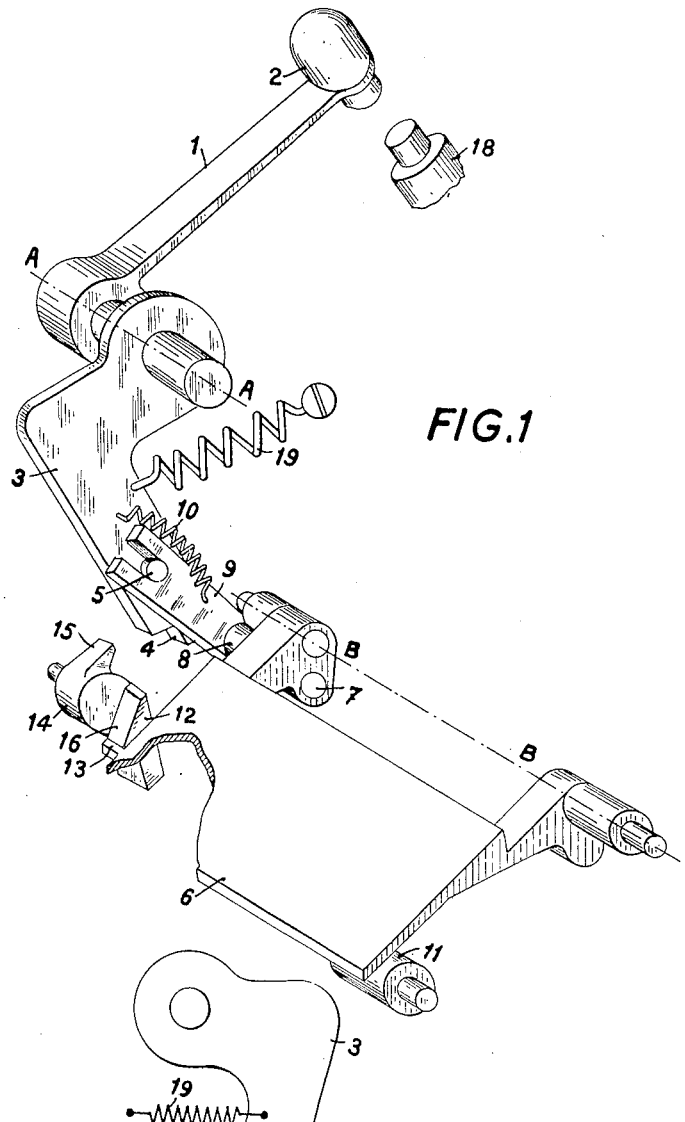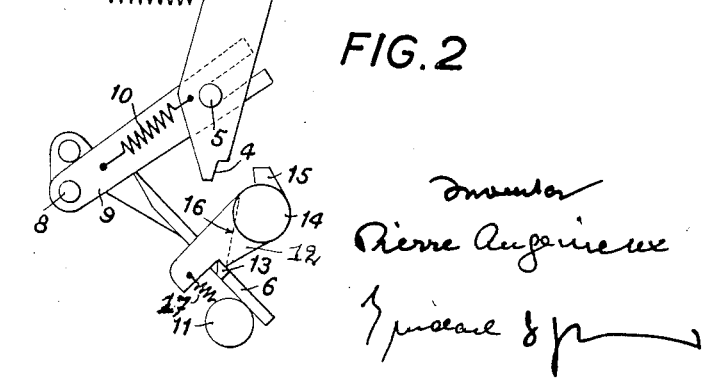

2,579,247

UNITED STATES PATENT OFFICE 2,579,247

MIRROR OPERATING DEVICE FOR REFLEX CAMERAS

Pierre Angénieux, Saint-Heand, France

Application June 24, 1948, Serial No. 35,016
In France March 20, 1948

3 Claims. (Cl. 95—42)

My invention relates to a device for removing the viewfinder mirror in so-called "Reflex" photographic cameras and with the aid of which it is possible simply by actuating a lever at first to remove the viewfinder mirror automatically, then to release the shutter for taking the picture, and finally to return the mirror in its initial position as soon as the action upon the actuating lever is discontinued.

The mirror-removing device according to my invention is characterized essentially in that a pivoted actuating lever on the path of which the shutter release lever is arranged is connected through a spring with a crankpin rigid with the aforesaid mirror, which in turn is pivotally mounted and normally locked in viewfinding position by a pawl to be disengaged by the actuating lever in such manner that by rocking said actuating lever the latter stresses the spring progressively and following the disengagement of the pawl snaps the mirror into inoperative position by the recoil effect of the spring, while as soon as the actuating lever which at all times is yieldingly urged towards its initial position is released, the mirror is returned to viewfinding position.

Further features of the invention will be pointed out in the following description of a preferred embodiment, given by way of example, of a mirror removing device according to the invention.

Figure 1 is a perspective view of said device.

Figures 2, 3, 4 and 5 show various positions assumed by the parts of the device during its operation.

Figure 3:
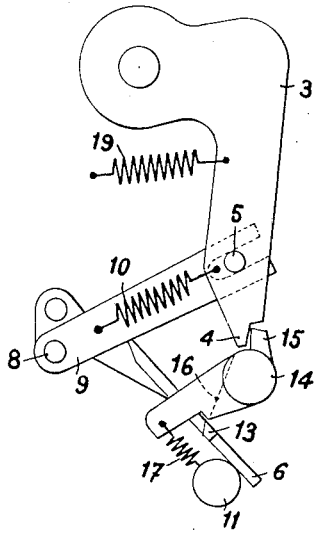

A lever or trigger 1 rockable about an axis A—A is actuated by the operator who depresses the push button 2. Said trigger is rigid with a lever 3 formed at its free end with a finger 4 and carries a pin 5. The mirror 6 is mounted on trunnions for swinging motion about an axis B—B parallel with axis A—A. Pivoted on the outer end 8 of a pin 7 carried by said mirror and parallel with axes A—A and B—B is an arm 9 the bifurcated end of which straddles the aforesaid pin 5, so that in the position of rest of the mechanism said pin abuts the bottom of the slot in the fork.

Moreover, levers 3 and 9 are yieldingly interconnected by a draw spring 10 which in the position of rest of the mechanism is already stressed.

In the said position of rest the mirror engages a stop 11. Said mirror is kept in its normal or reflecting position in one direction by said stop 11 and in the other direction by a pawl 12 cooperating with a lug 13 rigid with the mirror 6. Said pawl 12 is rigid with a rockable hublike member 14 formed with a catch 15 to be engaged by the finger 4 as the push button 2 is depressed. Pawl 12 is formed with a bevel 16 adapted to act as a cam in re-setting the mechanism. A return spring 17 (not shown in Fig. 1) connects the stop 11 with the hub 14).

Visible at 18 in Fig. 1 is the shutter release push button, while 19 designates a spring by which lever 1 is restored to its lifted position. The movements of lever 3 and hub 14 are limited by stops (not shown).

The mechanism operates as follows:

Fig. 2 will first be considered in which said mechanism occupies its initial position.

Figure 4:
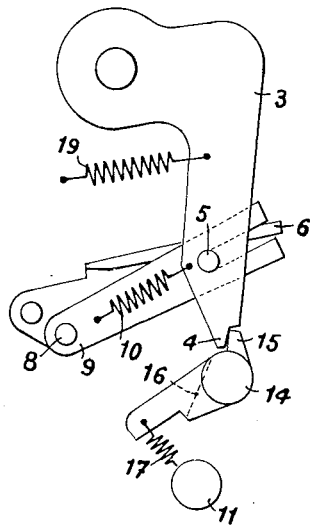
Figure 5:
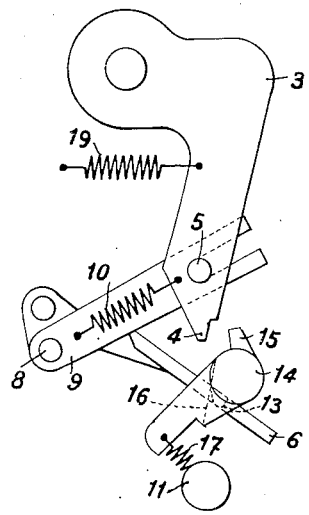

By depressing the trigger 1 at 2, the operator causes the lever 3 to rock and thus moves the finger 4 into engagement with the catch 15. This is a preparatory stage in the course of which the pin 5 has cleared the bottom of the slot in arm 9, thus increasing the stress on spring 10. As the rocking movement continues, the hub 14 is rocked slightly by the action of finger 4 upon catch 15, whereby the pawl 12 is progressively disengaged from the lug 13 on the mirror. In the position shown in Fig. 3 the disengagement is almost complete and the mirror is about to be unlocked. Upon the completion of such unlocking, arm 9 is actuated by the action of spring 10; since it is connected with the mirror by means of the end 8 of pin 7, said mirror is snapped upwards about the axis B—B until the bottom of the slot in arm 9 has come again into engagement with pin 5. The mirror is thus removed from the field (Fig. 4).

As the trigger 1 is depressed by a further amount, it comes into engagement with push 18, thus releasing the shutter-actuating mechanism while the catch 15 and the hub 14 may continue their movements without inconveniences.

As soon as the operator releases the push 2 the lever 3 is urged towards its initial position by the action of spring 19, yet since the pin 5 now lies in the bottom of the slot in arm 9, the latter will partake of the movement, whereby the mirror will be swung back downwards. In the course of this movement the lug 13 on the mirror will cam away the beveled end 16 of pawl 12 until the latter catches the lug again and thus lock the mirror. The lever 3 thereafter proceeds towards its initial position. The mechanism is thus reset ready for a new operation.

It will be understood that the scope of the invention is determined by the appended claims and is not limited to the details of design described hereinbefore merely by way of example, and that modifications may be made therein without thereby departing from the scope of the invention.

What I claim as new is:

1. A device for removing the viewfinder mirror in reflex photographic cameras provided with a shutter-release member comprising a hinge about which said mirror can be swung into either of two positions in which the optical axis of the camera lens is intercepted or cleared respectively, a pair of stops on either side of the mirror adapted to keep it in its light-intercepting position, one of said stops being fixed while the other can be moved to release said mirror, a trigger rockable to a position of rest away from both the shutter release member and said movable stop and adapted as it is actuated to engage at first said movable stop and then said shutter release member, a spring connecting said trigger with said mirror and disposed at rest in such manner that said spring urges said mirror against said movable stop and that the stress on said spring is increased as the trigger is moved away from its position of rest, whereby when the trigger is moved from its position of rest, the spring is progressively stressed while the mirror is fixedly maintained by said movable stop, which in turn is moved progressively away from the mirror by said trigger until it leaves said mirror and causes the same to pivot suddenly away from the optical axis, the shutter release member being then actuated.

2. A device according to claim 1, further comprising a guiding pin rigid with the trigger and an arm pivoted at one end thereof on said mirror and formed at its other end with a fork adapted to cooperate with said guiding pin, the aforesaid spring being anchored on the one hand to said trigger and on the other hand to said arm, and return means urging said trigger in its position of rest.

3. A device according to claim 1 wherein a bevel is formed on the movable stop to be engaged by the mirror as the same is moved back to its initial position, by means of which bevel said movable stop is cammed clear of the mirror until same is back in its original position.

PIERRE ANGÉNIEUX.

REFERENCES CITED

The following references are of record in the file of this patent:

UNITED STATES PATENTS

| Number | Name | Date |
|---|---|---|
| 2,249,517 | Crumrine | July 15, 1941 |

FOREIGN PATENTS

| Number | Country | Date |
|---|---|---|
| 271,145 | Great Britain | May 16, 1927 |
| 577,664 | Germany | June 2, 1933 |